United States Patent
Salvador et al.

(10) Patent No.: US 8,524,405 B2
(45) Date of Patent: Sep. 3, 2013

(54) DETECTION OF SMALL ANODE LEAKS IN FUEL CELL SYSTEMS

(75) Inventors: John P. Salvador, Penfield, NY (US); Joseph Nicholas Lovria, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 458 days.

(21) Appl. No.: 12/784,060

(22) Filed: May 20, 2010

(65) Prior Publication Data

US 2011/0287327 A1 Nov. 24, 2011

(51) Int. Cl.
*H01M 8/04* (2006.01)

(52) U.S. Cl.
USPC ........... 429/428; 429/408; 429/429; 429/430; 429/431; 429/432; 429/443; 429/448; 429/449

(58) Field of Classification Search
USPC .......... 429/408, 414, 427–432, 443, 448–449
See application file for complete search history.

(56) References Cited

U.S. PATENT DOCUMENTS

| 2004/0001980 A1* | 1/2004 | Balliet et al. ..................... 429/13 |
| 2011/0143243 A1* | 6/2011 | Arthur et al. ................... 429/429 |

OTHER PUBLICATIONS

Steven R. Falta et al., U.S. Appl. No. 12/636,276, filed Dec. 11, 2009, entitled "Injector Flow Measurement for Fuel Cell Applications".

* cited by examiner

*Primary Examiner* — Patrick Ryan
*Assistant Examiner* — Ben Lewis
(74) *Attorney, Agent, or Firm* — John A. Miller; Miller IP Group, PLC

(57) ABSTRACT

A system and method for detecting small hydrogen leaks in an anode of a fuel cell system. The method includes determining that a shut-down sequence has begun, and if so, deplete the cathode side of a fuel cell stack of oxygen. The method then increases the pressure of the anode side of the fuel cell stack to a predetermined set-point, and monitors the pressure decay of the anode side of the stack. The method compares the rate of pressure decay to an expected pressure decay rate, and if the measured pressure decay rate exceeds the expected pressure decay rate by a certain threshold, determines that a potential leak exists.

20 Claims, 2 Drawing Sheets

DETECTION OF SMALL ANODE LEAKS IN FUEL CELL SYSTEMS

BACKGROUND OF THE INVENTION

1. Field of the Invention

This invention relates generally to a system and method for detecting small anode leaks in a fuel cell system and, more particularly, to a system and method for detecting small anode leaks in a fuel cell system that looks at the rate of anode pressure decay at system shut-down.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes, or catalyst layers, typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, the gas diffusion layer (GDL), that protects the mechanical integrity of the membrane and also helps in uniform reactant humidity diffusion. MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. The fuel cell stack also receives an anode hydrogen input reactant gas that flows into the anode side of the stack. Not all of the oxygen is consumed by the stack and some of the air is output as a cathode exhaust gas that may include water as a by-product of the chemical reaction taking place in the stack.

A fuel cell stack typically includes a series of bipolar plates positioned between the several MEAs in the stack, where the bipolar plates and the MEAs are positioned between two end plates. The bipolar plates include anode side and cathode side flow distributors, or flow fields, for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is typically difficult to detect small hydrogen leaks in the anode of fuel cell systems. Large hydrogen leaks, such as a valve being open, can typically be detected using an anode inlet injector diagnostic or a flow meter. However, small anode leaks that might not be significant enough to exceed hydrogen emissions requirements, may not be detectable using an anode inlet injector diagnostic. Although small hydrogen leaks may not necessarily present an emissions problem, it is still desirable to correctly account for all hydrogen in the system for efficiency reasons and otherwise. Sources of small anode leaks could include small leaks through improperly seated valves, hydrogen cross-over through the membrane to the cathode side of the stack and/or small anode overboard leaks. Of these, hydrogen cross-over to the cathode is the most probable. Fortunately, cross-over leaks typically develop over tens to hundreds of operating hours, rather than seconds to minutes.

At fuel cell system start-up, assuming enough time has elapsed since the previous shut-down, most of the hydrogen remaining in the stack at the last shut-down has diffused out of the stack and both the cathode and anode flow channels are generally filled with air. When hydrogen is introduced into the anode flow channels at system start-up, the hydrogen pushes the air out of the anode flow channels creating a hydrogen/air front that travels through the anode flow channels. As described in the literature, the presence of the hydrogen/air front on the anode side combined with air on the cathode side causes electrochemical reactions to occur that result in the consumption of the carbon support on the cathode side of the MEA, thereby reducing the life of the MEAs in the fuel cell stack.

One known technique for significantly reducing the air/hydrogen front at system start-up, and thus, reducing catalytic corrosion is to reduce the frequency of start-ups in which the anode and cathode are filled with air. One strategy to achieve this is to leave the anode and cathode in a nitrogen/hydrogen environment. However, the hydrogen will eventually either diffuse out of the anode, or be consumed by oxygen slowly returning to the stack. Thus, in order to extend the ability to reduce catalytic corrosion, small amounts of hydrogen can be periodically injected into the stack while the system is shut-down. Because mostly nitrogen is remaining in the cathode side at system shut-down, as the result of the oxygen being consumed by the fuel cell reaction, nitrogen and hydrogen are the main elements that are equalized in the cathode and anode sides of the fuel cell stack after system shut-down. This does not allow oxygen in the air to form the air/hydrogen front.

When the fuel cell system is shut down, the gas permeation continues through the membrane until the gas component partial pressures have equalized on both sides of the membrane. The diffusivity of hydrogen through the membrane from the anode to the cathode is approximately three times the rate of nitrogen from the cathode to the anode. Higher hydrogen diffusivity rates equate to a rapid equalization of hydrogen partial pressures compared to a relatively slow equalization of nitrogen partial pressure. The difference in gas diffusivities causes the anode sub-system absolute pressure to drop until the cathode hydrogen partial pressure reaches the anode hydrogen partial pressure. Typically, the anode side of the fuel cell stack is operated at a high hydrogen concentration, such as greater than 60%, and large volumes of hydrogen-rich gas exist in the anode headers and anode plumbing outside of the anode of the stack. As the anode absolute pressure drops, more hydrogen is drawn out of the anode sub-system into the anode flow field of the stack.

SUMMARY OF THE INVENTION

In accordance with the teachings of the present invention, a system and method are disclosed for detecting small hydrogen leaks in an anode of a fuel cell system. The method includes determining that a shut-down sequence has begun, and if so, deplete the cathode side of a fuel cell stack of oxygen. The method then increases the pressure of the anode side of the fuel cell stack to a predetermined set-point, and monitors the pressure decay of the anode side of the stack. The method compares the rate of pressure decay to an expected pressure decay rate, and if the measured pressure decay rate exceeds the expected pressure decay rate by a certain threshold, determines that a potential leak exists.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for detecting small anode leaks in a fuel cell system is merely exemplary in nature, and is in no way intended to limit the invention or its applications or uses.

Figure 1:
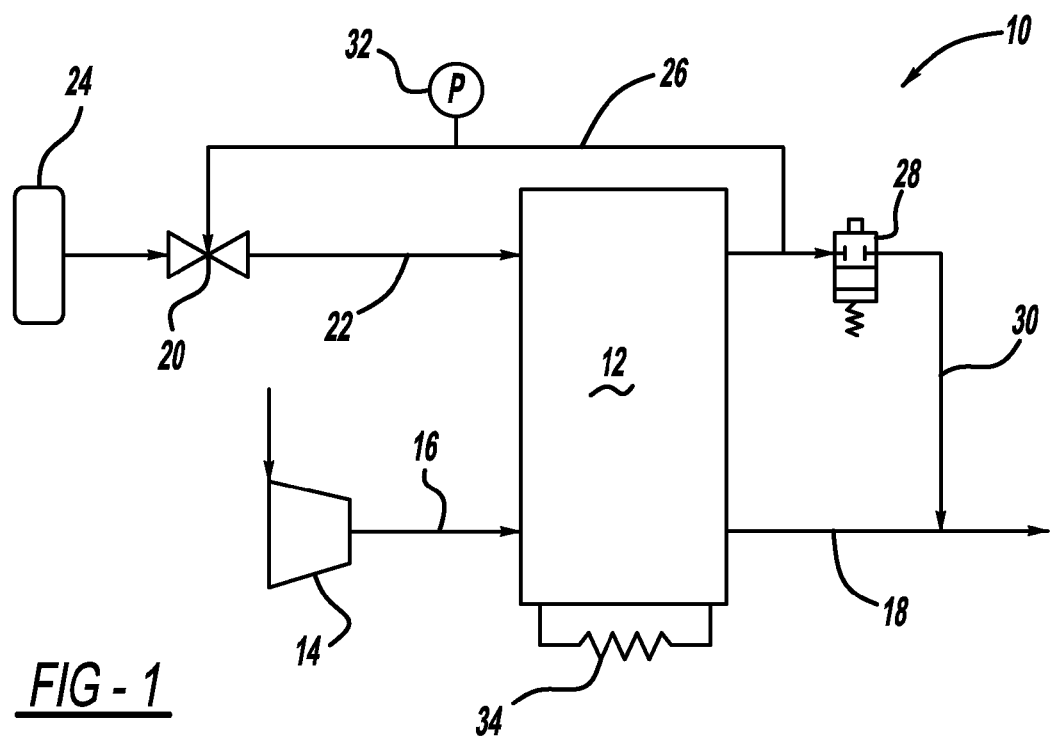
FIG. 1 is a schematic block diagram of a fuel cell system.

FIG. 1 is a schematic plan view of a fuel cell system 10 including a fuel cell stack 12. A compressor 14 provides compressed air to the cathode side of the fuel cell stack 12 on a cathode input line 16. A cathode exhaust gas is output from the fuel cell stack 12 on a cathode exhaust gas line 18. An injector 20 injects hydrogen gas into the anode side of the fuel cell stack 12 on an anode input line 22 from a hydrogen gas source 24, such as a high pressure tank. The anode gas that is exhausted from the fuel cell stack 12 is recirculated back to the injector 20 on a recirculation line 26. As is well understood in the art, it is periodically necessary to bleed the anode exhaust gas to remove nitrogen from the anode side of the stack 12. A bleed valve 28 is provided in an anode exhaust line 30 for this purpose, where the bled anode exhaust gas is combined with the cathode exhaust gas on the line 18 to dilute the hydrogen gas within the anode exhaust gas to be below combustible and/or emissions limits. A pressure sensor 32 is provided in the recirculation line 26 and provides a measurement of the pressure in the anode sub-system. Although the pressure sensor 32 is in the recirculation line 26 in this embodiment, the pressure sensor 32 can be provided at any position within the anode sub-system that is suitable to take an accurate reading of the anode pressure. A resistor represents an auxiliary load 34 on the stack 12.

As will be discussed in detail below, the present invention proposes an algorithm that is employed at fuel cell system shut-down to determine whether small hydrogen leaks are present in the anode sub-system. At system shut-down, once the cathode oxygen is consumed, or depleted, such as by using the auxiliary load 34, an anode to cathode pressure differential is created. The algorithm then measures the rate of pressure decay of the anode and compares it to an expected pressure decay rate to assess an anode leak rate.

A normal system shut-down will consume the majority of the oxygen in the cathode plumbing, and all of the oxygen in the cathode flow-field. This is identified by the average cell voltage falling to less than 50 mV while the stack 12 is coupled to the load 34. Excess hydrogen gas flows into the anode to fulfill tank sensing requirements. At the end, the anode is left with a slightly elevated pressure, such as 150 kPa, which decays after the stack load is removed. In one proposed embodiment, on a regular interval, the shut-down operation would be modified to assess if the hydrogen injector model is still accurate, and if the hydrogen leak rate is higher than the base-line. The specific interval could be fixed, or could be increased as evidence of a leak appearing.

During system shut-down, the anode pressure is held at a lower set-point through the oxygen depletion stage, such as 120 kPa. Once the stack voltage has fallen below the set-point, such as 50 mV/cell, all of the stack loads are removed, and the anode pressure is increased to a high set-point, such as 200 kPa. The resulting 80 kPa pressure fill can be used through the ideal gas law to estimate the hydrogen added to the anode. This can be compared to the value estimated by the injector model. The length of time required for the pressure to decay from the 200 kPa to a lower pressure, such as 130 kPa, can then be used to estimate the leak rate.

By design, a fuel cell membrane is permeable to hydrogen and therefore elevated anode pressures are naturally relieved through the membrane to the cathode. The driving force is the partial pressure difference of hydrogen in the anode and cathode. As a result, the decay rate is influenced by the amount of hydrogen in the cathode and anode, and the rate of hydrogen removal from the anode, either by reaction or convection. Similarly, the ending pressure should be selected so that there is still a large absolute pressure differential between anode and cathode to ensure that there is still a significant partial pressure driving force. This procedure is implemented at the end of shut-down, or any other time after stack voltage has collapsed due to oxygen consumption. For the open circuit voltage to decay to an extremely low level, such as 50-100 mV, the cathode flow-field oxygen concentration is typically <<1%. Hydrogen is naturally always crossing to the cathode when a driving force is present. If there was a significant amount of oxygen available in the cathode, it would consume the hydrogen as it crossed over. Estimations of hydrogen flow would then require an understanding of the oxygen inventory on the cathode. Furthermore, if there was even a small load on the stack 12, inaccuracies in current sensing could easily be of the same order of magnitude as a possible leak.

If the vehicle is restarted before the pressure has reached its final threshold, the algorithm can assess if there has been sufficient data to make an interim assessment, such as smaller differential pressure versus less time, or the procedure could be attempted again on the next shut-down.

In an alternate embodiment, it might be possible to use this procedure during a hydrogen injection event during a hydrogen while off procedure. This could also be performed as part of a stand-by procedure, although there is a probability that the system would be restarted before a sufficient measurement is collected.

In the discussion above, the pressure was increased to a relatively high value, such as 200 kPa, to maximize the likelihood of reliably observing the response. Depending on the system geometry, it is possible that the change in pressure decay rate would be large enough to measure a leak rate with a normal anode pressure set-point. In that instance, the algorithm could be used on every shut-down.

During the sharp pressure increase, there is a known amount of hydrogen added to the anode through the ideal gas law. This can be used to check the calibration on the injector flow model. That algorithm already exists, and what is described above merely offers a clean opportunity to provide input data.

Figure 2:
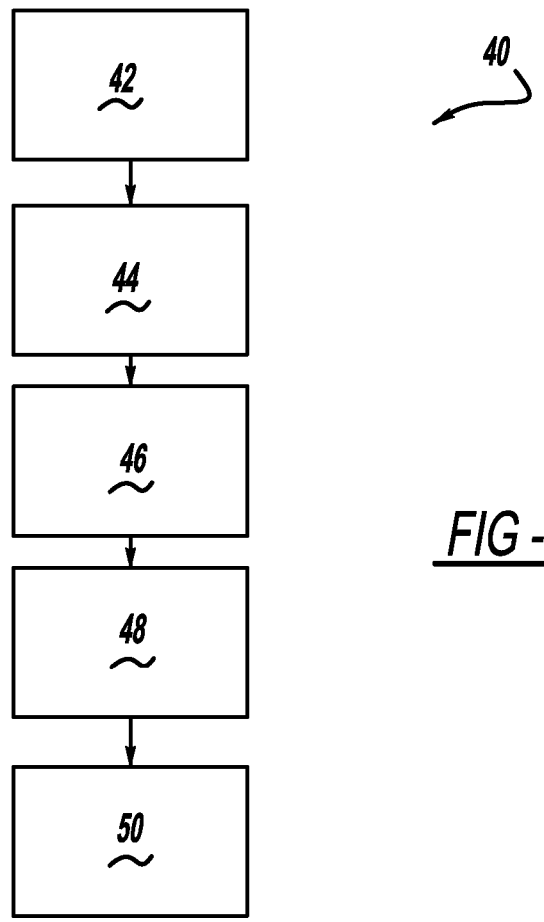
FIG. 2 is a flow chart diagram showing a process for detecting small anode leaks.

FIG. 2 is a flow chart diagram 40 showing one process for detecting small anode leaks consistent with the discussion above. The algorithm begins during a shut-down sequence of the fuel cell system 10 as represented by box 42. During the shut-down sequence, the cathode side is depleted of oxygen at box 44 using any suitable technique, such as turning off the compressor 14 and connecting the stack 12 to the auxiliary load 34 while maintaining hydrogen gas flow to the anode. The algorithm determines that the cathode is substantially depleted of oxygen once the cell voltage falls below a certain minimum cell voltage. Once the cathode side is depleted of oxygen, and the valves are closed to seal the cathode side, the anode side pressure is increased by providing hydrogen gas to the anode side of the stack 12 to a desired pressure set-point at box 46, such as 200 kPa. Once the anode pressure reaches the set-point, hydrogen gas flow is stopped, and the valves are closed to seal the anode side and hold the anode side at that pressure. The algorithm would then monitor the pressure decay or decrease over time at box 48 using a pressure sensor, such as the pressure sensor 32, and compare that pressure decay to an expected pressure decay at box 50 based on the system volume, system design, system configuration, etc., to determine whether the actual pressure decay meets the expected decay. If the pressure decay of the anode is too fast as compared to a predetermined threshold, then the algorithm can set a flag indicating that an anode leak is probable.

The pressure set-point can be any suitable pressure set-point for determining and monitoring the pressure decay. The determination of the anode leak can be performed at any selection of shut-down sequences, including every shut-down, and the pressure set-point can be varied or increased depending on whether a small leak becomes more likely. The expected decay can be a nominal expected decay, or can be a calibrated decay determined based on the life and operation of the system. Further, the time of monitoring the decay can be any suitable time based on the system configuration, for example, 30 seconds to two minutes.

Once the algorithm identifies that there is or may be a leak, secondary metrics could be used to determine the type of leak. For example, on the next shut-down, or during entry into a stand-by state, the voltage decay rate with a fixed anode pressure can be used to assess the type of leak. If the minimum cell voltage decay rate is substantially faster than the average cell voltage, then it is likely that the issue is an internal membrane issue, such as a pin hole. If the stack voltage has a more typical decay rate, the leakage is likely through an anode exhaust valve, or overboard, or a uniform increase in hydrogen cross-over. Determination of a leak rate can be used to modify anode concentration models, along with other decisions.

Figure 3:
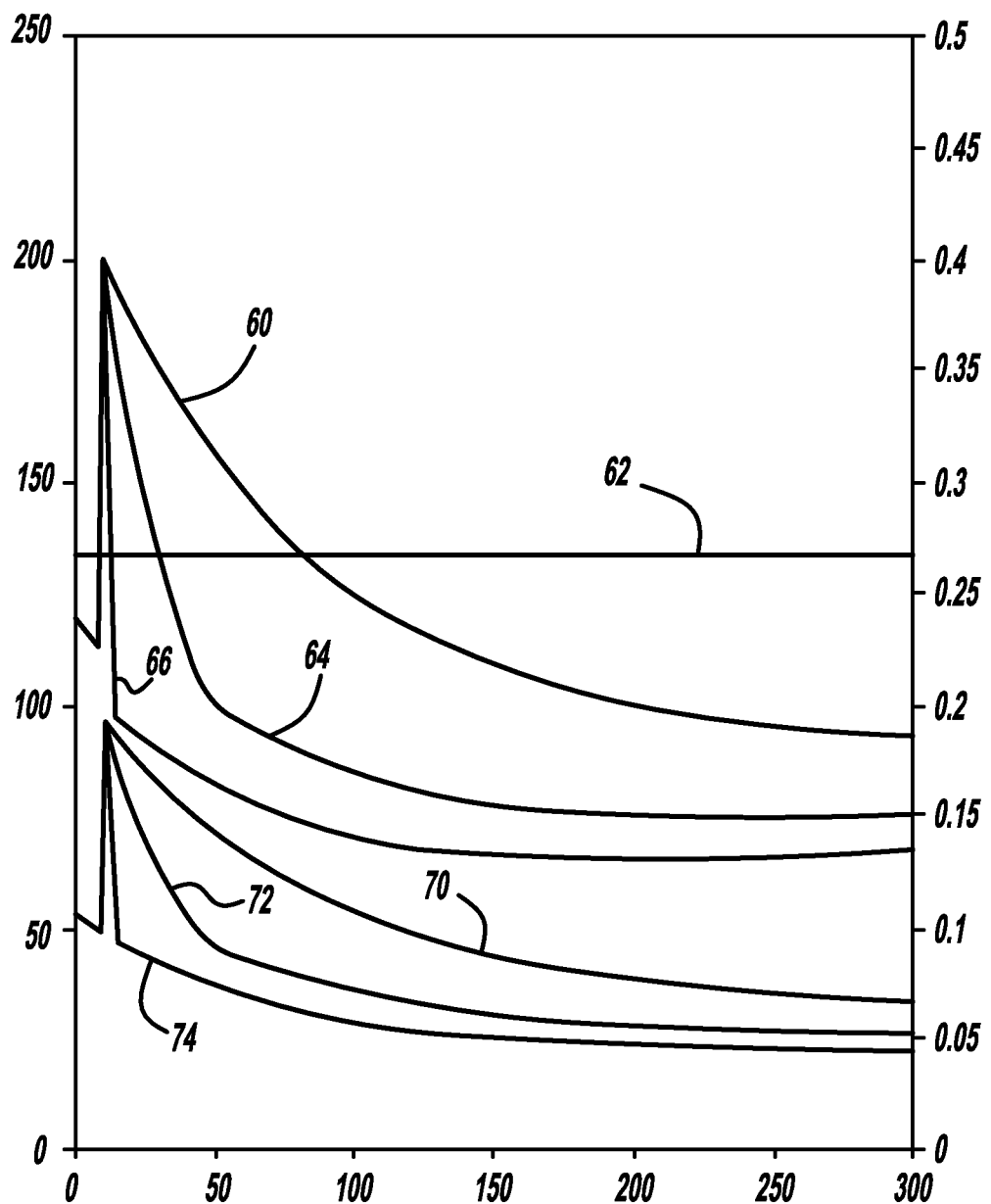
FIG. 3 is a graph with time on the horizontal axis, pressure on the left vertical axis and moles on the right vertical axis.

FIG. 3 is a graph with time on the horizontal axis, pressure on the left vertical axis and moles on the right vertical axis. Graph line 60 shows a normal anode pressure decay from 200 kPa to a threshold line 62 at 133.6 kPa in 73 seconds. Graph line 64 shows an anode pressure decay for a 0.001 mol/s leak at 10 kPa from 200 kPa to the threshold line 62 in 20 seconds. Graph line 66 shows an anode pressure decay for a 0.01 mol/s leak at 10 kPa from 200 kPa to the threshold line 62 in 4 seconds. Graph line 70 shows normal hydrogen permeation in an anode with no leaks, graph line 72 shows hydrogen permeation in an anode with a 0.001 mol/s leak at 10 kPa and graph line 74 shows hydrogen permeation in an anode with a 0.01 mol/s leak at 10 kPa.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining if there is a leak in an anode side of a fuel cell stack in a fuel cell system, said method comprising:
   determining that the fuel cell system is in a shut-down condition;
   depleting a cathode side of the fuel cell stack of oxygen;
   increasing the pressure of the anode side of the fuel cell stack to a predetermined pressure set-point after the cathode side is depleted of oxygen;
   sealing the anode side of the fuel cell stack when it has reached the pressure set-point;
   monitoring a decay of the pressure in the anode side of the fuel cell stack; and
   comparing the pressure decay to a predetermined pressure decay to determine whether the pressure decay indicates that there is a leak in the anode side of the fuel cell stack.

2. The method according to claim 1 wherein comparing the pressure decay includes determining whether the pressure decay has reached a predetermined pressure threshold within a predetermined period of time.

3. The method according to claim 1 wherein comparing the pressure decay includes determining that an anode leak exists if the pressure decay exceeds the expected pressure decay by a predetermined threshold.

4. The method according to claim 1 further comprising determining a leak rate if the pressure decay indicates that there is an anode leak.

5. The method according to claim 4 further comprising modifying internal control models using the leak rate.

6. The method according to claim 1 wherein depleting the cathode of oxygen includes coupling the stack to an auxiliary load without providing cathode air to the fuel cell stack.

7. The method according to claim 1 further comprising determining the type of anode leak.

8. The method according to claim 7 wherein determining the type of anode leak includes determining that the leak is a membrane leak in a single or a few cells if a minimum cell voltage decay rate is substantially faster than an average cell voltage decay rate.

9. The method according to claim 7 wherein determining the type of anode leak includes determining that the leak is a valve leak, an overboard leak or a uniform membrane thinning if the minimum cell voltage decay rate is about the same as the average cell voltage decay rate.

10. A method for determining if there is a leak in an anode side of a fuel cell stack in a fuel cell system, said method comprising:
    determining that the fuel cell system is in a shut-down condition;
    depleting a cathode side of the fuel cell stack of oxygen by coupling the stack an auxiliary load without providing cathode air to the stack;
    increasing the pressure of the anode side of the fuel cell stack relative to the cathode side to a predetermined pressure set-point after the cathode side is depleted of oxygen;

monitoring a decay of the pressure in the anode side of the fuel cell stack after the pressure of the anode side of the fuel cell stack has been increased to the pressure set-point; and determining that an anode leak is present if the anode pressure reaches a predetermined pressure threshold within a predetermined period of time.

11. The method according to claim 10 further comprising determining a leak rate if it is determined that there is an anode leak.

12. The method according to claim 11 further comprising modifying internal control models using the leak rate.

13. The method according to claim 10 further comprising determining the type of anode leak.

14. The method according to claim 13 wherein determining the type of anode leak includes determining that the leak is a membrane leak in one or a few cells if a minimum cell voltage decay rate is substantially faster than an average cell voltage decay rate.

15. The method according to claim 13 wherein determining the type of anode leak includes determining that the leak is a valve leak, an overboard leak or a uniform membrane thinning if the minimum cell voltage decay rate is about the same as the average cell voltage decay rate.

16. A system for determining if there is a leak in an anode side of a fuel cell stack in a fuel cell system, said system comprising:

means for determining that the fuel cell system is in a shut-down condition;

means for depleting a cathode side of the fuel cell stack of oxygen;

means for increasing the pressure of the anode side of the fuel cell stack to a predetermined pressure set-point after the cathode side is depleted of oxygen;

means for sealing the anode side of the fuel cell stack when it has reached the pressure set-point;

means for monitoring a decay of the pressure in the anode side of the fuel cell stack; and means for comparing pressure decay to an expected pressure decay to determine whether the pressure decay indicates that there is a leak in the anode side of the fuel cell stack.

17. The system according to claim 16 wherein the means for comparing the pressure decay determines whether the pressure decay has reached a predetermined pressure within a predetermined period of time.

18. The system according to claim 16 wherein the means for comparing the pressure decay determines that an anode leak exists if the pressure decay exceeds the expected pressure decay by a predetermined threshold.

19. The system according to claim 16 further comprising means for determining a leak rate if the pressure decay indicates that there is an anode leak.

20. The system according to claim 19 further comprising means for modifying internal control models using the leak rate.

* * * * *